Figure 1:
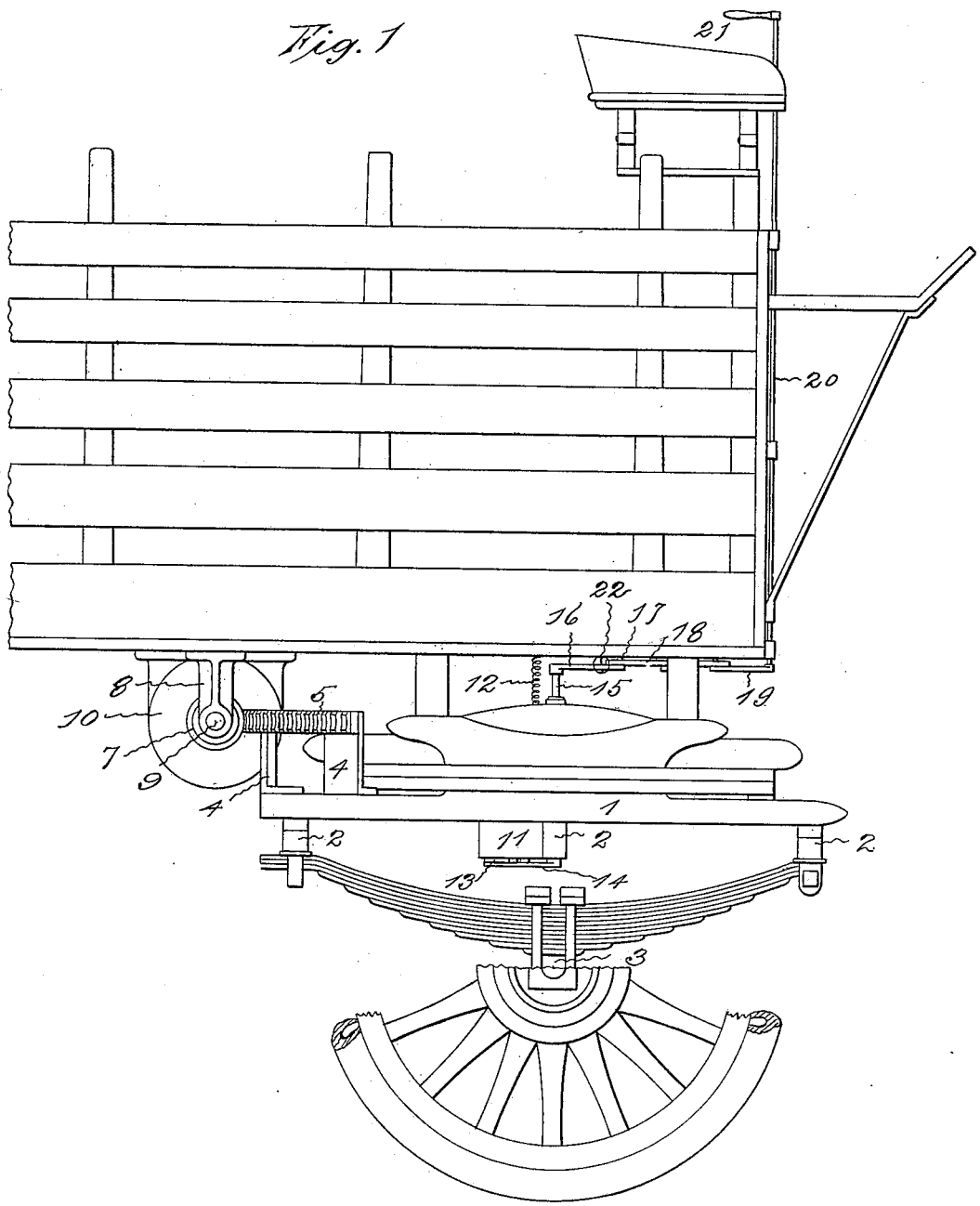

No. 650,840. Patented June 5, 1900.
H. E. HEATH.
STEERING MECHANISM FOR MOTOR VEHICLES.
(Application filed Nov. 15, 1899.)
(No Model.) 2 Sheets—Sheet 1.

Witnesses: Inventor:
F. G. Holcombe. Harry E. Heath, by
C. E. Buckland. Harry R. Williams, Atty.

No. 650,840. Patented June 5, 1900.
H. E. HEATH.
STEERING MECHANISM FOR MOTOR VEHICLES.
(Application filed Nov. 15, 1899.)
(No Model.) 2 Sheets—Sheet 2.
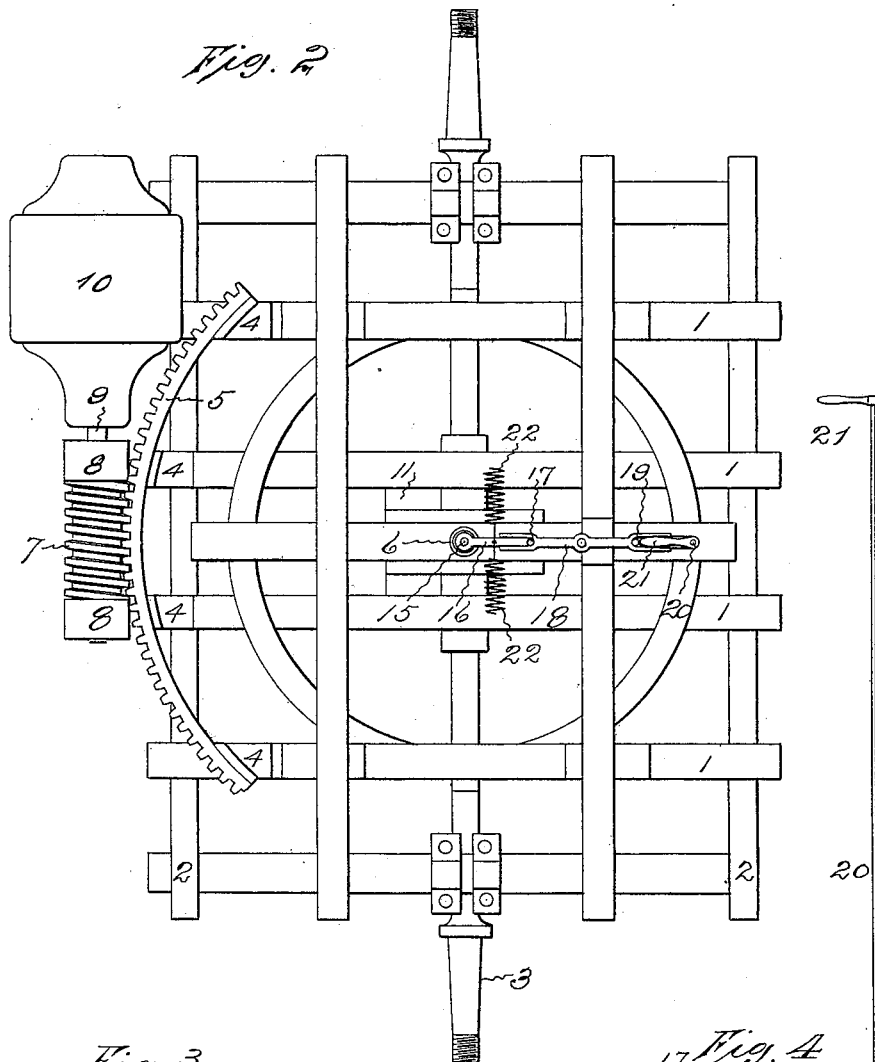
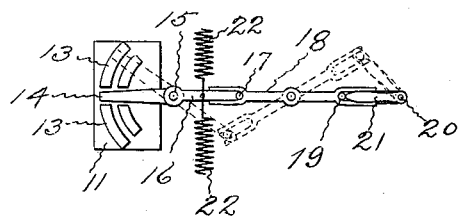
Witnesses: Inventor:
F. G. Holcomb. Harry E. Heath, by
C. E. Buckland. Harry R. Williams, atty.
THE NORRIS PETERS CO., PHOTO-LITHO., WASHINGTON, D. C.

UNITED STATES PATENT OFFICE.

HARRY E. HEATH, OF WINDSOR, CONNECTICUT, ASSIGNOR TO THE EDDY ELECTRIC MANUFACTURING COMPANY, OF SAME PLACE.

STEERING MECHANISM FOR MOTOR-VEHICLES.

SPECIFICATION forming part of Letters Patent No. 650,840, dated June 5, 1900.

Application filed November 16, 1899. Serial No. 737,097. (No model.)

*To all whom it may concern:*

Be it known that I, HARRY E. HEATH, a citizen of the United States, residing at Windsor, in the county of Hartford and State of Connecticut, have invented certain new and useful Improvements in Steering Mechanism for Automobiles, of which the following is a specification.

This invention relates to a steering mechanism which is particularly adapted for trucks, drays, fire-engines, and the like heavy vehicles that are propelled by electrical power, although it is applicable to vehicles propelled by other power.

The object of the invention is to provide a very simple, powerful, and sensitive power-operated mechanism by means of which the course of such heavy vehicles as are fitted with this mechanism will be under absolute control, thus facilitating their use in crowded thoroughfares.

In the form of the invention illustrated by the accompanying drawings a curved rack is fastened to the turn-table-platform part, which is attached to and moves with the steering-axle, and a worm is fastened to the under side of the floor of the truck in position to mesh with the rack. The shaft of the worm is adapted to be rotated in both directions by a motor, the power for which is regulated by a controller that is carried by the movable part of the platform and is caused to operate by an arm connected with and moved by a handle located in the vicinity of the seat in position to be grasped by the driver.

Figure 1 of the views shows the side of the front end of a truck fitted with the invention. Fig. 2 is a plan of the turn-table platform and steering-axle of this truck. Fig. 3 is a plan of the controller mechanism, and Fig. 4 is a side elevation of the controller mechanism.

The truck shown is of ordinary design and is mounted upon a turn-table and platform of common construction that is supported in the usual manner by suitable wheels. Fastened to the longitudinal bars 1, that with the transverse bars 2 form the lower part of the platform that turns with the axle 3, are standards 4, and secured to the upper ends of these standards is a rack 5, that is provided with worm-teeth arranged on the arc of a circle, the center of which is coincident with the axis of the king-bolt 6, that connects the upper and lower parts of the platform. A worm 7 is so supported by brackets 8, depending from the floor of the truck, that it meshes with the rack-teeth. This worm is mounted upon the end of the shaft 9 of the armature of an electric motor 10, that is fastened to the under side of the truck. The rotation of the armature of this motor and the connected worm in one direction feeds the rack and causes the movable platform, axle, and wheels to oscillate on the king-bolt one way, and the reverse rotation of the armature and worm feeds the rack oppositely and causes the movable platform, axle, and wheels to oscillate the other way.

A controller 11 of common construction is fastened to the movable platform, so as to swing about the king-bolt with the axle, and the circuit-wires 12, that run along the truck-timbers from the propelling-batteries to the steering-motor, are so connected with this controller that when the circuit is closed through one set of terminal plates 13 the armature will rotate in one direction and when the circuit is closed through the other set of terminal plates 13 the armature will rotate in the reverse direction.

A contact-arm 14 oscillates upon an axis that is coincident with the axis of the king-bolt for opening and closing the circuit through the terminal plates. In the case illustrated the contact-arm is fastened to the lower end of a rod 15, that passes through the king-bolt, which is tubular. On the upper end of this rod is an arm 16, provided with a stud 17, that is engaged by the forked rear end of a lever 18, pivoted to the under side of the truck. The forked front end of this lever engages a stud projecting from the end of an arm 19 on the lower end of a rod 20, that extends upwardly in front of the truck to the vicinity of the seat, where in convenient reach of the driver it is provided with a handle 21. A turn of the handle turns the arm 19 on the other end of the rod 20, and this, through the lever 18 and arm 16, turns the contact-arm 14 in the same direction as the handle. When the handle stands straight, the contact-arm is below the dead-space between the sets of terminal plates 13; but a turn of the handle to one side moves the contact-arm in the same direction along one set of terminal plates a distance proportional to the movement of the handle, and the circuit thus being closed current passes through the motor in one direction and the steering-axle is turned one way. A movement of the handle to the other side moves the contact-arm along the other set of terminal plates and closes the circuit, so that the current will be directed in the other direction and cause the motor to reverse and turn the axle the other way. The motor is actuated as long as the contact-arm closes the circuit through the terminal plates, and as the controller, with the terminal plates, is attached to the movable platform, so as to move with the steering-axle, the terminal plates will be connected by the contact-arm when the handle is turned until the axle is turned far enough to bring the dead-space between the terminal plates above the contact-arm. As the motor operates to turn the axle until the terminal plates are moved from the contact-arm, the amount of turn given to the axle depends upon the distance the contact-arm is moved along the terminal plates by the handle. If the handle is turned but little, the contact-arm is moved along the terminal plates but little, and but a slight turn of the axle will carry the controller so that the dead-space is above the contact-arm, whereas if the handle is turned considerably the contact-arm is moved along the terminal plates quite a distance, and it will require much turn of the axle to bring the dead-space of the controller above the contact-arm. After the vehicle has been turned the handle may be turned straight or it may be released, allowing the springs 22 to act on the arm 16 and cause the handle to be turned straight. After a turn has been made when the handle is straightened the contact-arm is moved to the opposite set of terminal plates, and this causes the motor to reverse until the axle is so straightened out that the dead-point between the terminal plates is brought above the contact-arm.

By means of this mechanism the truck is required to run straight ahead at all times whether the handle is grasped by the driver or is free. If the handle is released, a jar on one side or an obstruction in front of one wheel will not turn the axle, for the parts are held locked by the engagement of the worm and rack. For this reason no exertion is necessary to keep the truck on a straight course. The driver is required to exert but the slight force necessary for turning the handle and the connecting levers and arms when guiding the heaviest trucks fully loaded, and the mechanism responds instantly, thus permitting a maximum speed to be maintained with heavy loads at a minimum risk of accident.

I claim as my invention—

1. The combination with a vehicle, of a motor, intermeshing gearing adapted to be rotated by the motor, one member of the gearing being supported by the vehicle-body and the other member being supported by the part of the turn-table that is movable with the steering-axle, a controller for regulating the direction of flow of the actuating fluid to the motor, secured to the movable part of the turn-table, an arm supported upon an axis that is coincident with the axis of oscillation of the steering-axle and a lever in the vicinity of the seat adapted to cause the coöperation of the arm and controller, substantially as specified.

2. The combination with a vehicle, of a motor, a worm supported by the vehicle-body and adapted to be rotated by the motor, a curved rack attached to the part of the turn-table that is movable with the steering-axle and engaged by worm, a controller for regulating the direction of flow of the actuating fluid to the motor, secured to the movable part of the turn-table, an arm supported by a part fixed with relation to the vehicle-body, and arranged to cause the controller to act, and a lever in the vicinity of the seat adapted to move the arm, substantially as specified.

3. The combination with a vehicle, of the motor, intermeshing gearing adapted to be rotated by the motor, one member of the gearing being supported by the vehicle-body and the other member being supported by the part of the turn-table that is movable with the steering-axle, a controller for regulating the direction of flow of the actuating fluid to the motor, secured to the movable part of the turn-table, an arm supported upon an axis that is coincident with the axis of oscillation of the steering-axle, a lever in the vicinity of the seat adapted to cause the coöperation of the arm and controller, and springs for causing the lever when released to assume a normal position, substantially as specified.

4. The combination with a vehicle, of a motor, mechanism operated by the motor for oscillating the steering-axle, a controller and a movable arm for regulating the direction of the flow of the actuating fluid to the motor, one of said parts being secured to the part of the turn-table that is movable with the steering-axle and the other part being held with its axis coincident with the axis of oscillation of the steering-axle, and means for moving the axially-supported part with relation to the other part, substantially as specified.

HARRY E. HEATH.

Witnesses:
H. R. WILLIAMS,
F. G. HOLCOMBE.